United States Patent [19]

Pischke et al.

[11] Patent Number: 4,873,094

[45] Date of Patent: Oct. 10, 1989

[54] METHOD OF MAKING AN ACIDIFIED DAIRY CREAM

[75] Inventors: LaMonte D. Pischke; Ralph J. Greene, both of Eau Claire, Wis.

[73] Assignee: Land O'Lakes, Inc., Arden Hills, Minn.

[21] Appl. No.: 330,978

[22] Filed: Mar. 29, 1989

Related U.S. Application Data

[63] Continuation of Ser. No. 223,708, Jul. 21, 1988, abandoned, which is a continuation of Ser. No. 939,731, Dec. 9, 1986, abandoned.

[51] Int. Cl.⁴ .......................... A23C 9/12; A23L 3/00
[52] U.S. Cl. ........................................ 426/43; 426/61; 426/580; 426/583; 426/586; 426/570; 426/399
[58] Field of Search ................... 426/42, 43, 580, 583, 426/586, 399, 409, 34, 61, 570

[56] References Cited

U.S. PATENT DOCUMENTS 3,891,779  6/1975  Robinson ............................ 426/399
4,416,905  11/1983  Lundstedt et al. .................... 426/43

*Primary Examiner*—Marianne Cintins
*Attorney, Agent, or Firm*—Kinney & Lange

[57] ABSTRACT

An acidified dairy cream characterized by a non-grainy texture and the absence of cooked flavors is made by acidifying dairy-derived cream to a pH level of approximately 4.6 or below. The cream is then heated to a range of 222° F. to 264° F. while being subjected to a pressure of at least approximately 180 psig. The cream is then aseptically packaged.

20 Claims, 1 Drawing Sheet

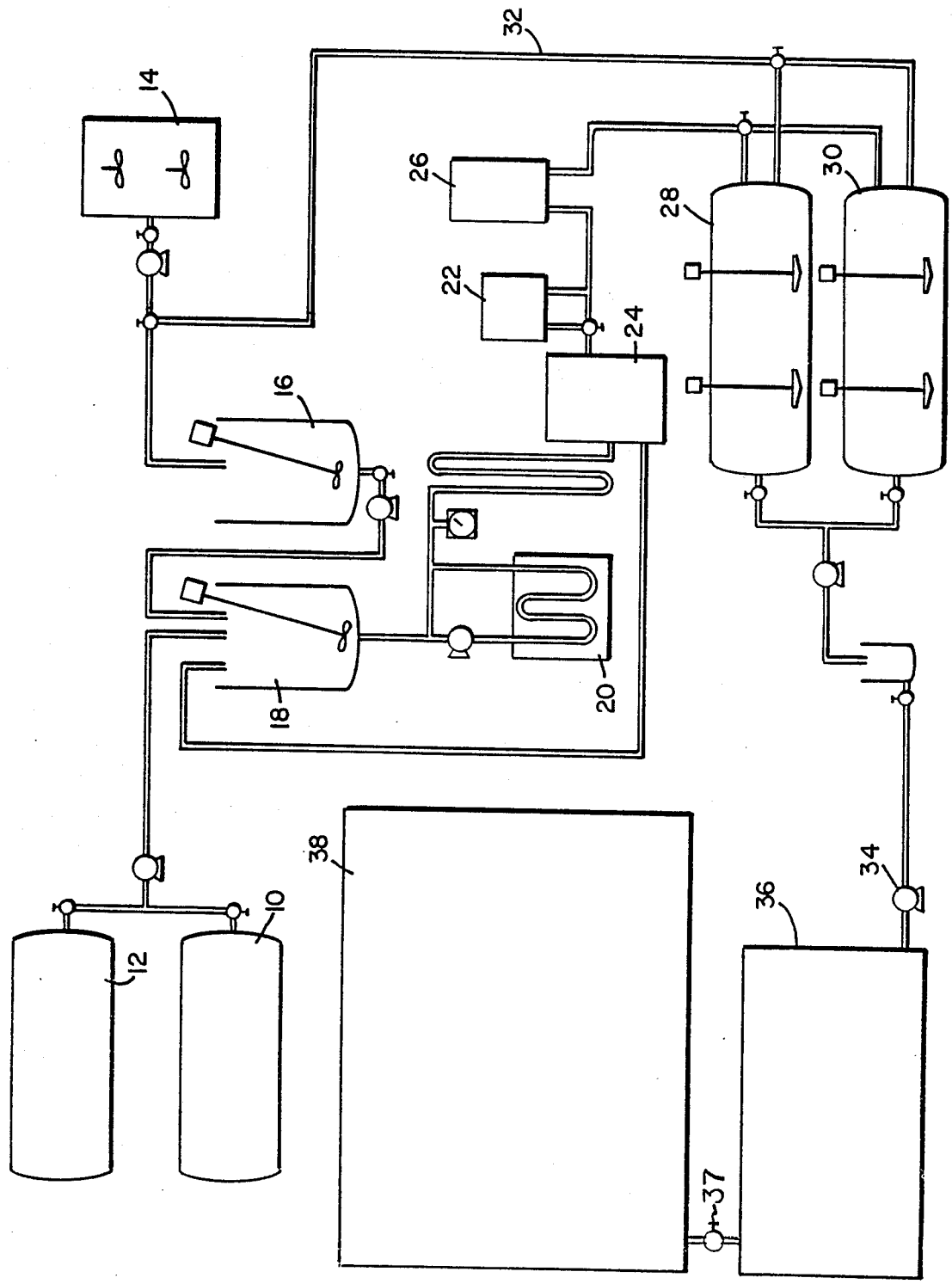

METHOD OF MAKING AN ACIDIFIED DAIRY CREAM

This is a continuation of application Ser. No. 223,708, filed on July 21, 1988, abandoned as of the date of this application. Which is a continuation of application Ser. No. 939,731, filed Dec. 9, 1986 (now abandoned).

BACKGROUND OF THE INVENTION

1. Field of the Invention

The present invention relates to cream fermentation processes, and in particular, it relates to a method of making a fermented dairy cream suitable for aseptic packaging.

2. Description of the Prior Art

There have been many attempts in producing a sour cream or a sour cream base dip that could be stored for relatively long periods of time. Most sour creams are sold locally due to their fungibility. Attempts to produce a sour cream having a long shelf life have resulted in the loss of flavor, due to overcooking, and/or a grainy texture.

An example of a process for producing a sterile cream product is described in the Swanson U.S. Pat. No. 3,117,879. The Swanson Patent describes a process for making a canned cream product wherein the cream is standardized to a selected milkfat to non-milkfat solids ratio and the milkfat is homogenized so that the fat particle size is less than two microns. The homogenized cream is sterilized at 295° F. for a short period of time (one to three seconds). The process described in the Swanson Patent, however, is unsuitable for a cultured or acidified cream product since scorching and cooked flavors would occur due to the low pH and high temperatures that are used.

The Evers U.S. Pat. No. 4,376,126 describes a method of producing yogurt including aseptically packaging the yogurt. The Hollis et al U.S. Pat. No. 3,483,001 describes a method of making a frozen confection including aseptically packaging the confection. However, neither the Evers or the Hollis et al processes are suitable for making an aseptically packaged sour cream.

An example of an aseptic packing process is disclosed in the Pioch U.S. Pat. No. 4,208,852.

SUMMARY OF THE INVENTION

The present invention includes a process for producing an acidified dairy cream characterized by a non-grainy texture and the absence of cooked flavors. The dairy cream is made by acidifying dairy-derived cream to a pH level of approximately 4.6 or below. The cream is then heated to a range of approximately 222° F. to 264° F. while simultaneously being subjected to a pressure of at least approximately 180 psig. The cream is then aseptically packaged.

BRIEF DESCRIPTION OF THE DRAWINGS

The drawing is a flow diagram of the process of the present invention.

DETAILED DESCRIPTION OF THE PREFERRED EMBODIMENTS

The process of the present invention produces a fermented dairy cream having a long shelf life, for example, six months or more. Preferably, the fermented dairy cream is a sour cream or sour cream base dip having the same type of flavor and characteristics as fresh sour cream even though the product of the present invention has remained in storage for an extended period of time.

Normally, sour cream made by prior art methods has a storage life of two to four weeks under refrigerated conditions. Cultured or acidified sour cream produced by prior art methods experience a continuous flavor degradation due to the microbial activity within the product. Eliminating this microbial activity, to extend the shelf life of sour cream would be desirable. However, previous attempts at "sterilizing" sour cream have produced a sour cream having a cooked or "off" flavor and/or exhibiting grainy characteristics, both undesirable. Presently, the short shelf life of sour cream produced by the prior art methods limits distribution of the sour cream to local or regional market areas. A sour cream having an extended shelf life would be highly suitable for distribution beyond a regional basis.

The process of the present invention acidifies a dairy-derived cream to a pH level of approximately 4.6 or below, and preferably in a range of 4.0 to 4.6 and more preferably approximately 4.4. The acidified cream is then heated to an approximate range of 222° F. to 264° F. while being subjected to a pressure of at least approximately 180 psig and preferably within a range of 180 to 200 psig. The cream is then aseptically packaged. The cream has an extended shelf life of greater than four weeks under ambient temperature conditions and it is believed that the shelf life of the cream of the present invention should be similar in length as other aseptically packaged products.

Referring to the FIGURE, which illustrates a working embodiment of the present invention, cream having an approximate milkfat content of 42% is stored in holding tanks 10 and 12. (Throughout the following description and example, all percentages are by weight except where specifically stated otherwise.) In a mixing vessel 14, non-fat milk solids such as skim milk powder, a low heat condensed skim milk are added and mixed with water for subsequent blending with the cream to increase the non-fat milk solids of the cream to about 40% to 55% by weight of the milkfat content and to standardize the milkfat content to 19% to 25%, and preferably 22%, by weight. The mixture from vessel 14 is pumped to a second mixing vessel 16 where the mixture is heated. The heated mixture from vessel 16 is then pumped to a blending vat 18 into which the cream from either vessel 10 or 12 is also added. The two streams are mixed such that the non-milkfat solids are in the range of 45% to 55% by weight of the milkfat content and the milkfat content is standardized to a range of 19% to 25%, and preferably 22%, by weight. To this standardized product is added sodium citrate, salt, disodium phosphate and mono and diglycerides.

From the blending vat 18, the mixture is introduced into a pasteurizer 20 where the mixture is heated to a range of about 185° F. to 200° F. for residence time of ten to fifty seconds. The resulting pasteurized product is then homogenized in a two-stage homogenizer 22 at about 2000 to 3000 pounds in the first stage and at about 500 pounds of pressure in the second stage. A diverter valve at 24 is provided between the pasteurizer and homogenizer for recirculation of product that cannot be accommodated by the homogenizer back to the blending vat 18.

After the homogenizer 22, the product is cooled to a temperature range of 70° F. to 74° F. through a triple tube cooler at 26. A bacteria culture is added to the cooled pasteurized product for fermenting the cream. The cream is fermented in storage tanks 28 and 30. The cream is fermented for twelve to sixteen hours or until a pH between 4.0 and 4.6 is reached and a titratable acidity of not less than 0.5% calculated as lactic acid.

The cultured product is then cooled within the tanks 28 and 30 to a temperature between 35° F. to 50° F. To the cooled cultured cream is added stabilizers such as starch, guar gum, to improve texture and to prevent synerisis. The stabilizers are prepared in mixing tank 14 and are added to the tanks 28 and 30 through line 32. In addition, sufficient water is added to the cream to standardize the milkfat level to not less than 18% by weight. Any optional ingredients, such as flavors, are added at this time to the cream. If the pH needs to be further adjusted after the optional ingredients have been added, then additional lactic acid is added to maintain the pH below 4.6.

The cultured cream is pumped from the culture tanks 28 and 30 by a positive displacement pump 34 that pumps the cultured cream through a sterilization unit 36. The cultured cream is processed between 222° F. and 264° F. for approximately two to three seconds at a pressure of 180 to 200 psi and preferably at approximately 245° F. and at least 180 psig.

Normal sterilization temperatures of 290° F. result in a sour cream with a grainy texture having a cooked flavor. The lower processing temperatures used in the present invention provide for a sour cream product without a cooked flavor while processing the sour cream at a high pressure through a restriction, such as a back pressure valve 37. The restriction 37 is positioned after the sterilization unit 36. Proper sterilization occurs at the lower temperatures used in the present invention due to the pH being below 4.6. The back pressure valve 37 smooths out the cream to produce a sour cream with a smooth texture similar to the texture of a quality sour cream produced by conventional methods.

After sterilization, the sour cream is cooled to between 90° F. and 130° F. and transferred to an aseptic packaging machine 38 wherein the sour cream is aseptically packaged.

The following example is illustrative only and is not intended to limit the present invention. The example is being submitted in order to demonstrate more explicitly the process of the present invention.

EXAMPLE

A cultured sour cream having a milkfat content of approximately 18.25%, a total solids content of approximately 28.3% and a pH of approximately 4.54.

To good quality cream having a milkfat content of approximately 42% and a total solids of approximately 47.2% is added sufficient milk solids-nonfat and water to achieve a milkfat content of approximately 20.35 and total solids of approximately 28.81. To this cream, salt, disodium phosphate, sodium citrate and mono and diglycerides are added. This condensed slurry is then heated, using a STE-VAC Heater manufactured by Chester-Jensen Company, Inc. of Chester, Pa., to 185° F. with a 25 second hold tube. The condensed slurry is then homogenized at 3000 psi (500 psi for 2nd, stage and 2500 psi for 1st stage) and cooled through a triple tube cooler to approximately 71° F. incubation temperature.

Starter culture that consists of lactic acid *streptococci* and flavor-producing Leuconostoc bacteria are added using Fargo 300 series and 701 cultures, sold by Microlife Technics of Sarasota, Fla., respectively at recommended levels. After inoculation, the slurry is allowed to incubate for 12 to 14 hours. When pH reaches 4.6 or below and titratable acidity is about 0.7% to 0.8% the cultured condensed slurry is agitated and starch is added with sufficient water to standardize the product to achieve a minimum fat content of 18.0% and total solids of approximately 28.3%. The product is cooled to about 40° F.

The standardized sour cream is processed aseptically through a Cherry-Burell Swept Surface System (manufactured by Cherry-Burell, Inc. of Iowa, U.S.A.) at registered conditions. If the pH is between 4.1 to 4.6, the process temperature will range from 222° F. to 264° F. for 2.63 seconds at flow rates of 24 to 30 gallons per minute. The sterile sour cream is then packaged in hermetically sealed containers which have been sterilized by passing through a Model 530 sterilizer, sold by James Dole Corporation of Redwood City, Calif., at 360 cans per minute. The aseptically packaged sour cream is then labeled and cased by conventional methods.

Although the present invention has been described with reference to preferred embodiments, workers skilled in the art will recognize that changes may be made in form and detail without departing from the spirit and scope of the invention.

What is claimed is:

1. A method for processing an acidified dairy-derived cream, the method comprising:
   providing an acidified dairy-derived cream having a pH level below approximately 4.6;
   heating the cream to a temperature range of approximately 222° F. to 264° F. while simutaneously subjecting the cream to a pressure of at least approximately 180 psig for a time period sufficient to extend ambient temperature shelf life to at least four weeks; and
   aseptically packaging the cream.

2. The method of claim 1 wherein the dairy-derived cream has a pH level in an approximate range of 4.0 to below approximately 4.6.

3. The method of claim 1 wherein the level of the dairy-derived cream is approximately 4.4.

4. The method of claim 1 wherein the cream is subjected to a pressure in the approximate range of 180 to 200 psig.

5. The method of claim 1 wherein the dairy-derived cream is also cultured.

6. A processed acidified dairy-derived cream produced by the method of claim 1 wherein the cream is free of cooked flavor.

7. A processed acidified dairy-derived cream produced by the method of claim 1 which has a smooth texture.

8. A processed acidified dairy-derived cream produced by the method of claim 1 wherein the cream has a shelf life of at least six months under ambient temperature.

9. The method of claim 1 wherein the time period of heating is in an approximate range of 2 to 3 seconds.

10. The method of claim 1 wherein the time period of heating is approximately 2.63 seconds.

11. A method for processing an acidified dairy-derived cream, the method comprising:
   providing an acidified dairy-derived cream having a pH level below approximately 4.6;
   sterilizing the cream within a temperature range of approximately 222° F. to 264° F. while simultaneously subjecting the cream to a pressure of at least approximately 180 psig;

aseptically packaging the cream; and wherein the resulting packaged cream has at least a six month shelf life and retains the organoleptic properties of the initial acidified dairy-derived cream.

12. The method of claim 11 wherein the dairy-derived cream has a pH level in an approximate range of 4.0 to below approximately 4.6.

13. The method of claim 11 wherein the level of the dairy-derived cream is approximately 4.4.

14. The method of claim 11 wherein the cream is subjected to a pressure in the approximate range of 180 to 200 psig.

15. The method of claim 11 wherein the dairy-derived cream is also cultured.

16. A dairy-derived cream produced by the method of claim 11 wherein the cream is free of cooked flavor.

17. A dairy-derived cream produced by the method of claim 11 which has a smooth texture.

18. A dairy-derived cream produced by the method of claim 11 wherein the cream has the flavor of fresh sour cream.

19. A dairy-derived cream product produced by the method of claim 11 wherein the cream product is a sour cream base dip.

20. A continuous process for sterilizing an acidified, dairy-derived, cream product having a pH less than 4.6, in preparation for aseptic packaging, the process comprising:

heating the product to a temperature within the range of approximately 222° F. to 264° F. while simultaneously subjeting the product to a pressure within the range of approximately 180 psig to 200 psig for a detention time within the range of approximately 2 to 3 seconds; and homogenizing through a back pressure valve sufficient to generate the requisite pressure and detention time in the sterilization step.

* * * * *

UNITED STATES PATENT AND TRADEMARK OFFICE
CERTIFICATE OF CORRECTION

PATENT NO. : 4,873,094

DATED : October 10, 1989

INVENTOR(S) : LaMonte D. Pischke et al.

It is certified that error appears in the above-identified patent and that said Letters Patent is hereby corrected as shown below:

In the References Cited Section, under U.S. PATENT DOCUMENTS, add the following:

| | | | |
|---|---|---|---|
| 3,117,879 | 1/1964 | Swanson | 99/212 |
| 3,483,001 | 12/1969 | Hollis | 99/136 |
| 4,208,852 | 6/1980 | Pioch | 53/167 |
| 4,376,126 | 3/1983 | Evers | 426/43 |

In the References Cited Section, under OTHER PUBLICATIONS, add the following:

Pages 62-65 from Cheese and Fermented Milk Products, by Frank S. Kosikowski.

Column 6, line 15, delete "subjeting" and insert --subjecting--.

Signed and Sealed this

Twenty-fifth Day of September, 1990

Attest:

HARRY F. MANBECK, JR.

Attesting Officer        Commissioner of Patents and Trademarks